(12) United States Patent
Takeda et al.

(10) Patent No.: US 11,812,447 B2
(45) Date of Patent: Nov. 7, 2023

(54) SEMI PERSISTENT SCHEDULING PHYSICAL DOWNLINK SHARED CHANNELS FOR NEW RADIO MULTICAST

(71) Applicant: QUALCOMM Incorporated, San Diego, CA (US)

(72) Inventors: Kazuki Takeda, Tokyo (JP); Alberto Rico Alvarino, San Diego, CA (US); Le Liu, Fremont, CA (US); Xipeng Zhu, San Diego, CA (US); Prasad Reddy Kadiri, San Diego, CA (US); Umesh Phuyal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 189 days.

(21) Appl. No.: 17/443,295

(22) Filed: Jul. 23, 2021

(65) Prior Publication Data
US 2022/0046589 A1 Feb. 10, 2022

Related U.S. Application Data

(60) Provisional application No. 62/706,249, filed on Aug. 6, 2020.

(51) Int. Cl.
| | |
|---|---|
| *H04W 74/00* | (2009.01) |
| *H04W 72/30* | (2023.01) |
| *H04W 72/1273* | (2023.01) |
| *H04L 1/1867* | (2023.01) |
| *H04W 72/0453* | (2023.01) |
| *H04W 72/044* | (2023.01) |
| *H04W 72/0446* | (2023.01) |
| *H04W 72/23* | (2023.01) |

(52) U.S. Cl.
CPC .......... *H04W 72/30* (2023.01); *H04L 1/1896* (2013.01); *H04W 72/046* (2013.01); *H04W 72/0446* (2013.01); *H04W 72/0453* (2013.01); *H04W 72/1273* (2013.01); *H04W 72/23* (2023.01)

(58) Field of Classification Search
None
See application file for complete search history.

(56) References Cited

U.S. PATENT DOCUMENTS

| | | | |
|---|---|---|---|
| 2021/0099981 A1* | 4/2021 | Cirik | H04L 5/0044 |
| 2021/0160879 A1* | 5/2021 | Lin | H04L 1/0003 |
| 2021/0184812 A1* | 6/2021 | MolavianJazi | H04W 72/044 |
| 2021/0218504 A1* | 7/2021 | Wang | H04W 72/1273 |
| 2021/0243782 A1* | 8/2021 | Miao | H04L 5/0091 |
| 2022/0007399 A1* | 1/2022 | Rastegardoost | H04L 1/1854 |
| 2022/0061074 A1* | 2/2022 | Babaei | H04L 5/0053 |

(Continued)

FOREIGN PATENT DOCUMENTS

EP 4135396 A1 * 2/2023

*Primary Examiner* — Sithu Ko
(74) *Attorney, Agent, or Firm* — Harrity & Harrity, LLP

(57) ABSTRACT

Various aspects of the present disclosure generally relate to wireless communication. In some aspects, a user equipment (UE) may receive a configuration indicating a plurality of semi-persistent scheduling (SPS) physical downlink shared channel (PDSCH) communications associated with a multicast service. The UE may receive, based at least in part on determining that a reception condition is satisfied, an SPS PDSCH communication of the plurality of SPS PDSCH communications. Numerous other aspects are provided.

30 Claims, 10 Drawing Sheets

(56) References Cited

U.S. PATENT DOCUMENTS

2022/0239445 A1* 7/2022 Yoshioka .............. H04W 72/23
2022/0322410 A1* 10/2022 Matsumura ........... H04L 5/0094
2022/0361154 A1* 11/2022 Yoshioka .............. H04L 1/1671
2022/0377796 A1* 11/2022 Jung .................... H04L 1/1864

* cited by examiner

SEMI PERSISTENT SCHEDULING PHYSICAL DOWNLINK SHARED CHANNELS FOR NEW RADIO MULTICAST

CROSS-REFERENCE TO RELATED APPLICATION

This Patent Application claims priority to U.S. Provisional Patent Application No. 62/706,249, filed on Aug. 6, 2020, entitled "SEMI PERSISTENT SCHEDULING PHYSICAL DOWNLINK SHARED CHANNELS FOR NEW RADIO MULTICAST," and assigned to the assignee hereof. The disclosure of the prior Application is considered part of and is incorporated by reference into this Patent Application.

FIELD OF THE DISCLOSURE

Aspects of the present disclosure generally relate to wireless communication and to techniques and apparatuses for semi persistent scheduling physical downlink shared channels for New Radio multicast.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. "Downlink" (or "forward link") refers to the communication link from the BS to the UE, and "uplink" (or "reverse link") refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication performed by a user equipment (UE) includes receiving a configuration indicating a plurality of semi-persistent scheduling (SPS) physical downlink shared channel (PDSCH) communications associated with a multicast service; and receiving, based at least in part on determining that a reception condition is satisfied, an SPS PDSCH communication of the plurality of SPS PDSCH communications.

In some aspects, a method of wireless communication performed by a base station includes transmitting a plurality of SPS PDSCH communication activation indications corresponding to a plurality of SPS PDSCH communications associated with a multicast service; and transmitting, based at least in part on the plurality of SPS PDSCH communication activation indications, a plurality of instances of the plurality of SPS PDSCH communications.

In some aspects, a UE for wireless communication includes a memory and one or more processors coupled with the memory, wherein the one or more processors are configured to receive a configuration indicating a plurality of SPS PDSCH communications associated with a multicast service; and receive, based at least in part on determining that a reception condition is satisfied, an SPS PDSCH communication of the plurality of SPS PDSCH communications.

In some aspects, a base station for wireless communication includes a memory and one or more processors coupled with the memory, wherein the one or more processors are configured to transmit a plurality of SPS PDSCH communication activation indications corresponding to a plurality of SPS PDSCH communications associated with a multicast service; and transmit, based at least in part on the plurality of SPS PDSCH communication activation indications, a plurality of instances of the plurality of SPS PDSCH communications.

In some aspects, a non-transitory computer-readable medium storing a set of instructions for wireless communication includes one or more instructions that, when executed by one or more processors of a UE, cause the UE to receive a configuration indicating a plurality of SPS PDSCH communications associated with a multicast service; and receive, based at least in part on determining that a reception condition is satisfied, an SPS PDSCH communication of the plurality of SPS PDSCH communications.

In some aspects, a non-transitory computer-readable medium storing a set of instructions for wireless communication includes one or more instructions that, when executed by one or more processors of a base station, cause the base station to transmit a plurality of SPS PDSCH communication activation indications corresponding to a plurality of SPS PDSCH communications associated with a multicast service; and transmit, based at least in part on the plurality of SPS PDSCH communication activation indications, a plurality of instances of the plurality of SPS PDSCH communications.

In some aspects, an apparatus for wireless communication includes means for receiving a configuration indicating a plurality of SPS PDSCH communications associated with a multicast service; and means for receiving, based at least in part on determining that a reception condition is satisfied, an SPS PDSCH communication of the plurality of SPS PDSCH communications.

In some aspects, an apparatus for wireless communication includes means for transmitting a plurality of SPS PDSCH communication activation indications corresponding to a plurality of SPS PDSCH communications associated with a multicast service; and means for transmitting, based at least in part on the plurality of SPS PDSCH communication activation indications, a plurality of instances of the plurality of SPS PDSCH communications.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, or artificial intelligence-enabled devices). Aspects may be implemented in chip-level components, modular components, non-modular components, non-chip-level components, device-level components, or system-level components. Devices incorporating described aspects and features may include additional components and features for implementation and practice of claimed and described aspects. For example, transmission and reception of wireless signals may include a number of components for analog and digital purposes (e.g., hardware components including antennas, radio frequency chains, power amplifiers, modulators, buffers, processor(s), interleavers, adders, or summers). It is intended that aspects described herein may be practiced in a wide variety of devices, components, systems, distributed arrangements, or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
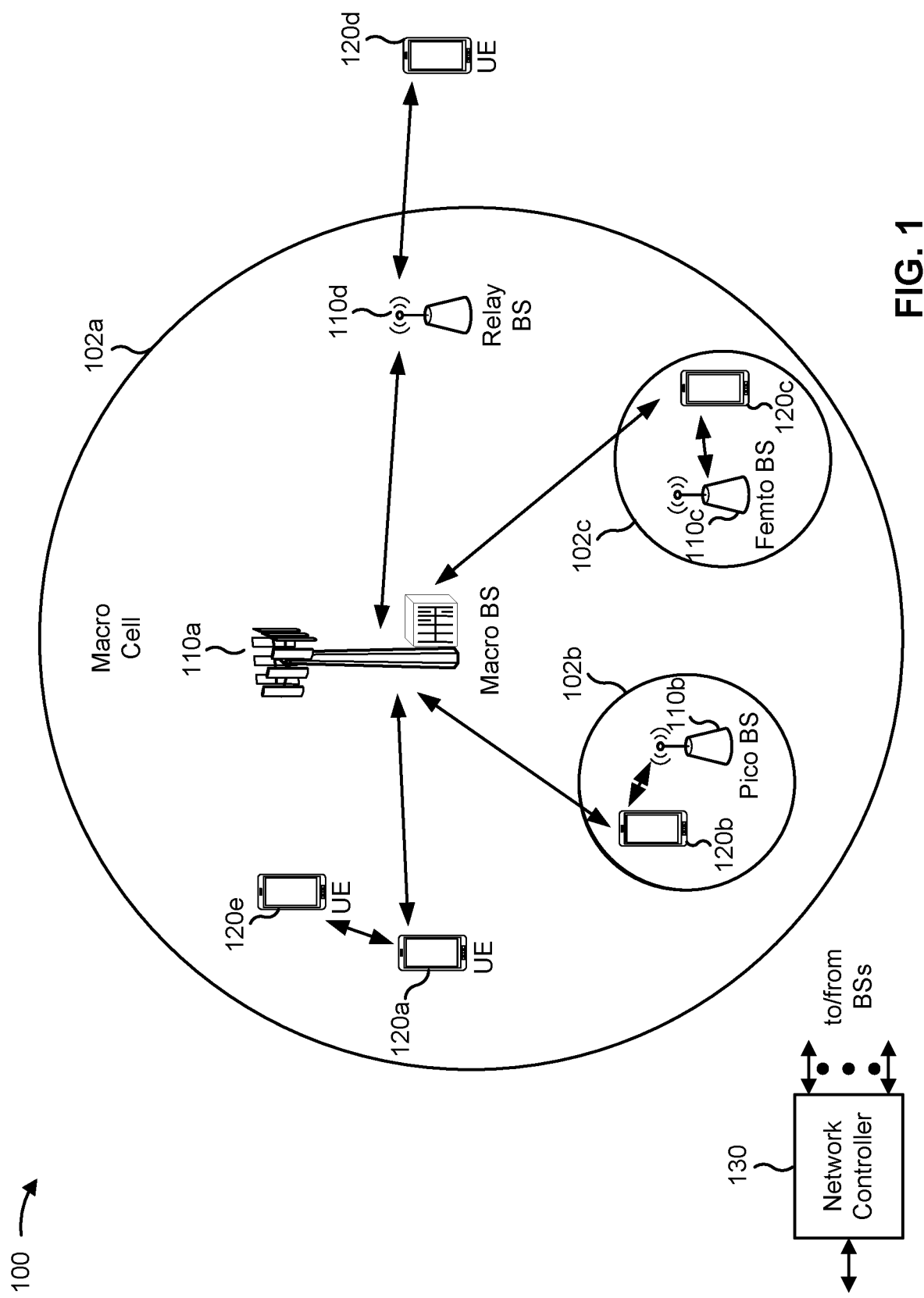
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (NR) network and/or an LTE network, among other examples. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, directly or indirectly, via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
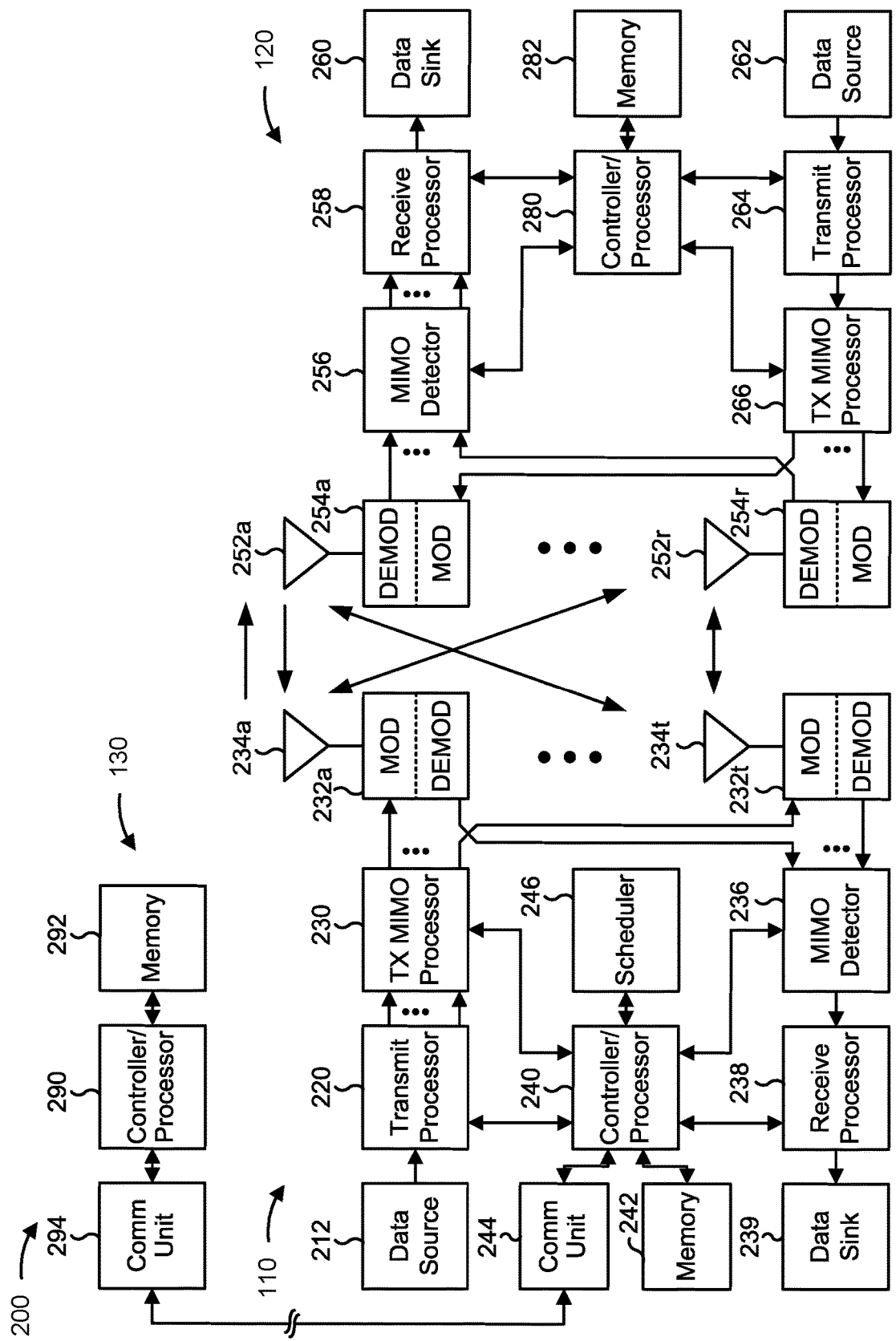
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some aspects, one or more components of UE 120 may be included in a housing.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein (for example, as described with reference to FIGS. 4-8).

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein (for example, as described with reference to FIGS. 4-8).

Controller/processor 240 of base station 110, controller/processor 280 of UE 120, and/or any other component(s) of FIG. 2 may perform one or more techniques associated with semi persistent scheduling (SPS) physical downlink shared channels (PDSCHs) for New Radio (NR) multicast, as described in more detail elsewhere herein. For example, controller/processor 240 of base station 110, controller/processor 280 of UE 120, and/or any other component(s) of FIG. 2 may perform or direct operations of, for example, process 700 of FIG. 7, process 800 of FIG. 8, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 700 of FIG. 7, process 800 of FIG. 8, and/or other processes as described herein. In some aspects, executing instructions may include running the instructions, converting the instructions, compiling the instructions, and/or interpreting the instructions, among other examples.

In some aspects, UE 120 may include means for receiving a configuration indicating a plurality of SPS PDSCH communications associated with a multicast service, means for receiving, based at least in part on determining that a reception condition is satisfied, an SPS PDSCH communication of the plurality of SPS PDSCH communications, and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

In some aspects, base station 110 may include means for transmitting a plurality of SPS PDSCH communication activation indications corresponding to a plurality of SPS PDSCH communications associated with a multicast service, means for transmitting, based at least in part on the plurality of SPS PDSCH communication activation indications, a plurality of instances of the plurality of SPS PDSCH communications, and/or the like. In some aspects, such means may include one or more components of base station 110 described in connection with FIG. 2, such as antenna 234, DEMOD 232, MIMO detector 236, receive processor 238, controller/processor 240, transmit processor 220, TX MIMO processor 230, MOD 232, antenna 234, and/or the like.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

Figure 3:
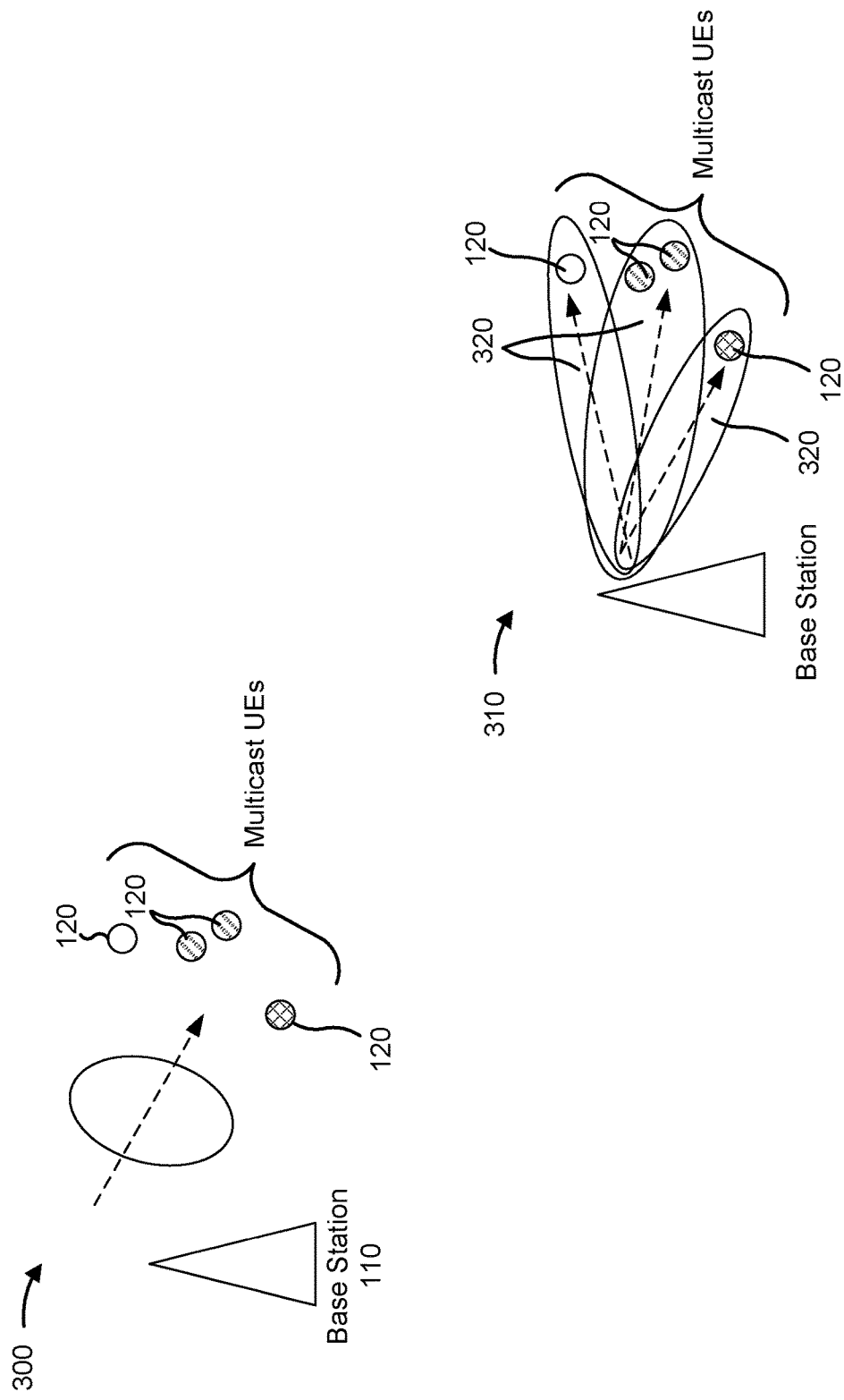
FIG. 3 is a diagram illustrating an example of multicasting, in accordance with the present disclosure.

FIG. 3 is a diagram illustrating an example 300 of multicast, in accordance with the present disclosure.

As shown in connection with reference number 300, a base station (e.g., base station 110) may multicast data to a plurality of UEs 120. The base station 110 may use a beam for this initial transmission. Accordingly, the UEs 120 may apply a corresponding spatial filter to receive and decode this transmission from the base station 110. In some aspects, as shown in connection with reference number 310, the base station 110 may perform multiple transmissions of the multicast data. As further shown in connection with reference number 310, the base station 110 may use a plurality of beams 320 for these transmissions. The plurality of beams 320 may be beamformed so that the data can be multicast in a plurality of simultaneous directions. One or more UEs 120 may receive the transmissions corresponding to a beam in one or more of the plurality of simultaneous directions.

In some situations, low code rates may be used to facilitate receipt, by the UEs 120, of the respective transmissions. As a result, throughput may be degraded. Aspects of the techniques and apparatuses described herein may facilitate multiple SPS PDSCH communications across multiple beams. As a result, reliability of the periodic transmissions may be enhanced.

In some aspects, the base station 110 may transmit a configuration to a UE 120 that indicates a plurality of SPS PDSCH communications associated with a multicast service. The base station 110 may transmit activation indications (e.g., using downlink control information (DCI) for each of the SPS PDSCH communications), and the UE 120 may receive the activation indications. In some aspects, the UE 120 may select an SPS PDSCH communication to receive based at least in part on determining that a reception condition is satisfied. In this way, the UE 120 may select one of a number of similar transmissions to receive based on a condition that may facilitate reliable receipt of the communication. In some aspects, the UE 120 may transmit acknowledgement or negative acknowledgment (ACK/NACK) feedback corresponding to the SPS PDSCH communication. In this way, SPS communications may be multicast to multiple UEs with high throughput and reliability.

As indicated above, FIG. 3 is provided as an example. Other examples may differ from what is described with respect to FIG. 3.

Figure 4:
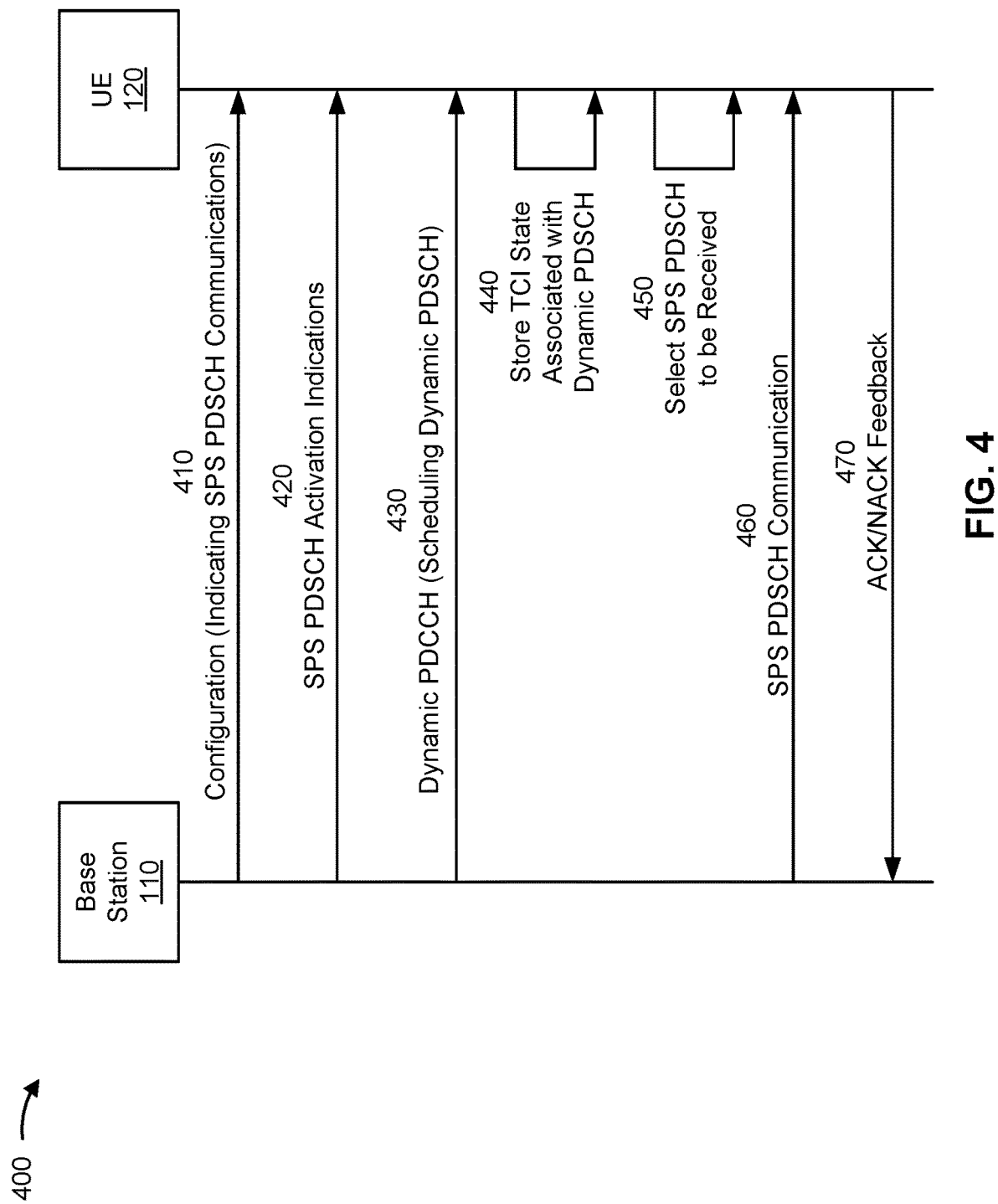
FIGS. 4-6 are diagrams illustrating examples associated with semi persistent scheduling (SPS) physical downlink shared channels (PDSCHs) for New Radio (NR) multicast, in accordance with the present disclosure.

FIG. 4 is a diagram illustrating an example 400 associated with SPS PDSCHs for NR multicast, in accordance with the present disclosure. As shown, a base station 110 and a UE 120 may communicate with one another. In some aspects, the base station 110 and the UE 120 may communicate via a wireless network, such as wireless network 100.

As shown by reference number 410, the base station 110 may transmit, and the UE 120 may receive a configuration. In some aspects, the configuration may indicate a plurality of SPS PDSCH communications associated with a multicast service. In some aspects, the base station 110 may transmit, and the UE 120 may receive an additional configuration indicating an additional plurality of SPS PDSCH communications associated with an additional multicast service. In some aspects, the configuration may be carried in a radio resource control (RRC) message.

As shown by reference number 420, the base station 110 may transmit, and the UE 120 may receive a plurality of SPS PDSCH communication activation indications corresponding to the plurality of SPS PDSCH communications. The plurality of SPS PDSCH communication activation indications may indicate a plurality of beams associated with the plurality of SPS PDSCH communications. In some aspects, the plurality of SPS PDSCH communication activation indications may be carried in at least one activation DCI communication.

In some aspects, the at least one activation DCI communication may include a cyclic redundancy check (CRC) that is scrambled using a radio network temporary identifier (RNTI). In some aspects, the RNTI comprises a group RNTI (G-RNTI) or a group scheduling RNTI (GS-RNTI). In some aspects, the G-RNTI or the GS-RNTI may correspond to the multicast service. In some aspects, an additional G-RNTI or an additional GS-RNTI may correspond to an additional multicast service. In some aspects, the RNTI is not a cell RNTI (C-RNTI) or a configured scheduling RNTI (CS-RNTI).

In some aspects, the at least one activation DCI communication may include a plurality of activation DCI communications. A first activation DCI communication of the plurality of activation DCI communications carries a first SPS PDSCH communication activation indication of the plurality of SPS PDSCH communication activation indications. A second activation DCI communication of the plurality of activation DCI communications carries a second SPS PDSCH communication activation indication of the plurality of SPS PDSCH communication activation indications.

In some aspects, the plurality of activation DCI communications may indicate a plurality of transmission configuration indicator (TCI) states associated with the plurality of SPS PDSCH communication activation indications. For example, a first activation DCI communication of the plurality of activation DCI communications may indicate a first TCI state associated with a first SPS PDSCH communication of the plurality of SPS PDSCH communications, and a second activation DCI communication of the plurality of activation DCI communications may indicate a second TCI state associated with a second SPS PDSCH communication of the plurality of SPS PDSCH communications.

In some aspects, the plurality of activation DCI communications may indicate a plurality of resource allocations associated with the plurality of SPS PDSCH communications. For example, a first activation DCI communication of the plurality of activation DCI communications may indicate a first resource allocation of the plurality of resource allocations, and a second activation DCI communication of the plurality of activation DCI indications may indicate a second resource allocation of the plurality of resource allocations. In some aspects, the plurality of resource allocations may include a time domain resource allocation, a frequency domain resource allocation, and/or the like.

As shown by reference number 430, the base station 110 may transmit, and the UE 120 may receive, a dynamic physical downlink control channel (PDCCH) communication that schedules a dynamic PDSCH communication. In some aspects, the UE 120 may determine the SPS PDSCH communication of the plurality of SPS PDSCH communications to receive based at least in part on the dynamic PDSCH communication. Because the UE 120 typically will receive a dynamic PDSCH communication from a base station of a serving cell, selecting an SPS PDSCH communication to receive based on a received dynamic PDSCH communication may facilitate increased likelihood of successful reception of the SPS PDSCH communication without requiring additional beam measurements and/or the like.

In some aspects, for example, a TCI state associated with the dynamic PDSCH communication may be used for selecting the SPS PDSCH communication. As shown by reference number 440, the UE 120 may store, in a memory, a TCI state associated with the dynamic PDSCH communication.

As shown by reference number 450, the UE 120 may select an SPS PDSCH communication to be received by the UE 120. In some aspects, the UE 120 may select an SPS PDSCH communication based on determining that a reception condition is satisfied based at least in part on a state associated with the SPS PDSCH communication. In some aspects, the UE 120 may determine that the reception condition is satisfied based at least in part on a relationship between a first TCI state that is associated with the dynamic PDSCH communication and a second TCI state that is associated with the SPS PDSCH communication. In some aspects, the UE 120 may determine that the reception condition is satisfied by determining that the first TCI state matches the second TCI state. In some aspects, the first TCI state may match the second TCI state if the first TCI state is the same as the second TCI state. In some aspects, the first TCI state may match the second TCI state if a difference between the first TCI state and the second TCI state satisfies a difference threshold.

In some aspects, the UE 120 may determine that the reception condition is satisfied by determining that the first TCI state is different than the second TCI state; and determining that a source synchronization signal block (SSB) corresponding to the first TCI state also corresponds to the second TCI state.

In some aspects, the UE 120 may determine that the reception condition is satisfied based at least in part on a TCI state associated with a control resource set (CORESET) that is associated with a search space set. The search space set may carry an activation DCI transmission that carries an SPS PDSCH communication activation indication corresponding to the SPS PDSCH communication. In some aspects, the UE 120 may monitor the search space set for a PDCCH in a first slot that occurs before a second slot, where the SPS PDSCH communication is associated with the second slot. The UE 120 may determine that the reception condition is satisfied by determining that the search space set is associated with the first slot.

In some aspects, if more than one SPS PDSCH communication satisfies the reception condition, the UE 120 may select one of the SPS PDSCH communications to receive based at least in part on a rule that may be configured in the UE 120. In some aspects, for example, the UE 120 may select the SPS PDSCH communication that is scheduled to be transmitted earlier in time than other SPS PDSCH communications satisfying the reception condition.

As shown by reference number 460, the base station 110 may transmit, and the UE 120 may receive, based at least in part on determining that a reception condition is satisfied, an SPS PDSCH communication of the plurality of SPS PDSCH communications. As shown by reference number 470, the UE 120 may transmit ACK/NACK feedback corresponding to the SPS PDSCH communication. In some aspects, the UE 120 may transmit the ACK/NACK feedback on a physical uplink control channel (PUCCH) resource associated with the SPS PDSCH communication. In some aspects, a plurality of PUCCH resources may be configured by RRC signaling or may be indicated by the DCI that has activated the SPS PDSCH communications. One of the plurality of PUCCH resources may be determined based on the selected SPS PDSCH communication of the plurality of SPS PDSCH communications.

As indicated above, FIG. 4 is provided as an example. Other examples may differ from what is described with respect to FIG. 4.

Figure 5:
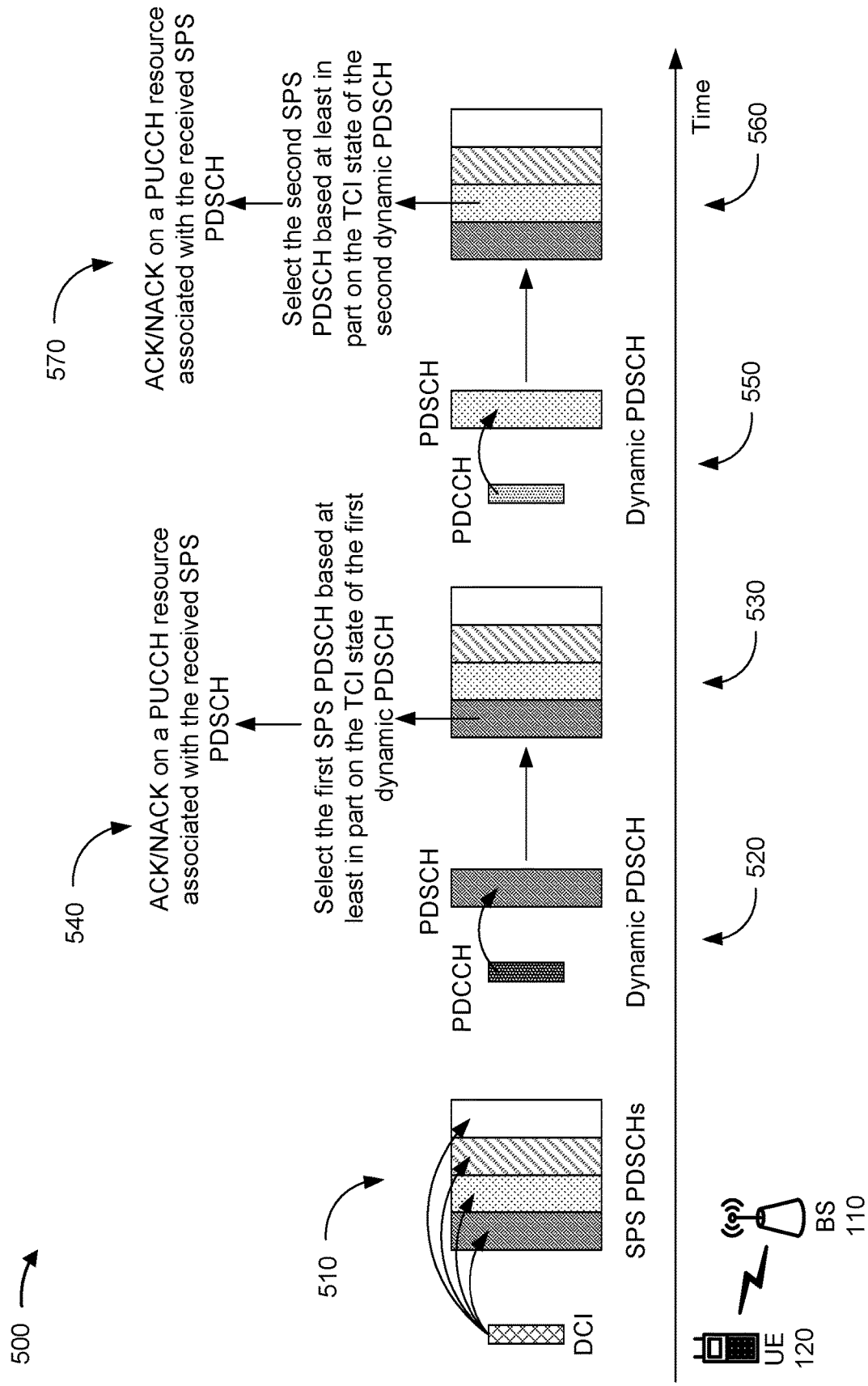

FIG. 5 is a diagram illustrating an example 500 associated with SPS PDSCHs for NR multicast, in accordance with the present disclosure. As shown, a base station 110 and a UE 120 may communicate with one another based at least in part on the illustrated communication sequence. In some aspects, the base station 110 and the UE 120 may communicate via a wireless network, such as wireless network 100.

As shown by reference number 510, the base station 110 may transmit, and the UE 120 may receive a DCI communication that includes a plurality of SPS PDSCH activation indications corresponding to a plurality of SPS PDSCH communications. In some aspects, one DCI communication may include the plurality of activation indications. In some aspects, a plurality of DCI communications may carry the activation indications.

As shown by reference number 520, the base station 110 may transmit, and the UE 120 may receive, a first dynamic PDCCH communication that schedules a dynamic PDSCH communication. The UE 120 may determine a TCI state associated with the first dynamic PDSCH communication. The UE 120 may store the TCI state and, as shown by reference number 530, the UE 120 may select an SPS PDSCH communication to receive based at least in part on the TCI state associated with the first dynamic PDSCH communication. Additionally, in some aspects, as shown by reference number 540, the UE 120 may transmit ACK/NACK feedback associated with the SPS PDSCH communication that the UE 120 receives. As a result, the base station 110 may use feedback to facilitate retransmissions and/or the like.

As shown by reference number 550, the UE 120 may subsequently receive a second PDCCH communication that schedules a second dynamic PDSCH communication having a different TCI state than the first dynamic PDSCH communication. For example, the TCI state associated with the first dynamic PDSCH communication may indicate a first beam with which the first dynamic PDSCH communication may be associated. A second TCI state associated with the second dynamic PDSCH communication may be associated with a second beam. In this way, the UE 120 may receive an SPS PDSCH communication on a second beam without having to receive a beam switching indication from the base station 110. As a result, aspects of the techniques described herein may facilitate reliable SPS PDSCH multicasting without unnecessarily increasing control signal traffic.

As shown by reference 560, the UE 120 may select, based at least in part on the TCI state of the second dynamic PDSCH communication, the second SPS PDSCH communication to be received. The UE 120 may receive the SPS PDSCH communication and, as shown by reference number 570, may transmit ACK/NACK feedback on a PUCCH resource associated with the received SPS PDSCH communication. Additionally or alternatively, the UE 120 may transmit the ACK/NACK feedback on a PUSCH resource.

As indicated above, FIG. 5 is provided as an example. Other examples may differ from what is described with respect to FIG. 5.

Figure 6:
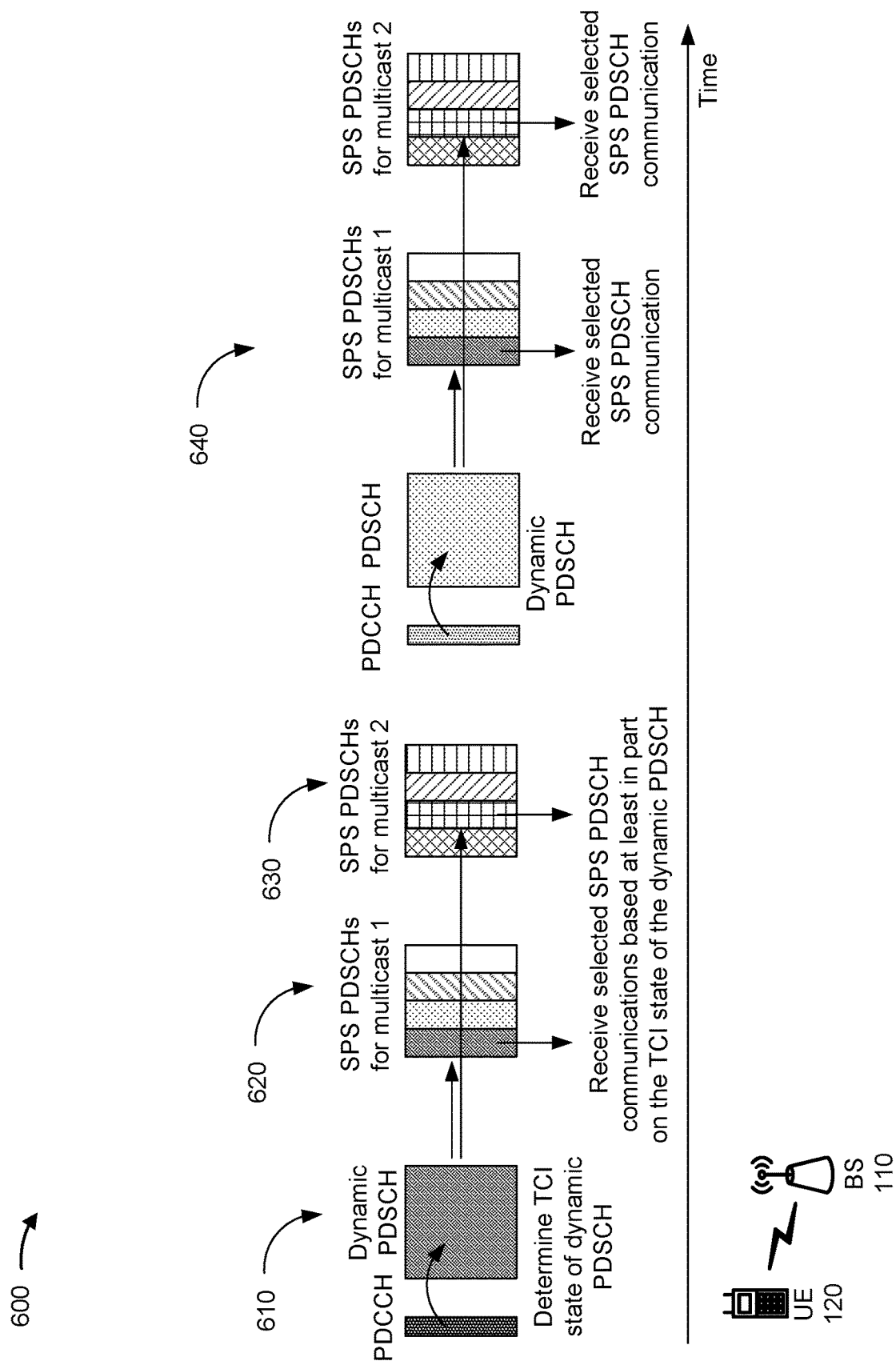

FIG. 6 is a diagram illustrating an example 600 associated with SPS PDSCHs for NR multicast, in accordance with the present disclosure. As shown, the base station 110 and the UE 120 may communicate with one another based at least in part on the illustrated communication sequence. In some aspects, the base station 110 and the UE 120 may communicate via a wireless network, such as wireless network 100.

In some aspects, a UE 120 may receive configurations of multiple sets of SPS PDSCH communications. For example, the base station 110 may configure a first plurality of SPS PDSCH communications associated with a first multicast service and a second plurality of SPS PDSCH communications associated with a second multicast service. In some aspects, the UE 120 may utilize a selection process described above for each of the multicast services.

For example, as shown by reference number 610, the base station 110 may transmit, and the UE 120 may receive, a dynamic PDCCH communication that schedules a dynamic PDSCH communication. As described above in connection with FIG. 5, the UE 120 may determine, for example, a TCI state associated with the scheduled dynamic PDSCH communication. As shown in connection with reference numbers 620 and 630, the UE 120 may receive selected SPS PDSCH communications. The UE 120 may use the TCI state of the dynamic PDSCH communication to select an SPS PDSCH communication to be received from each group of SPS PDSCH communications. As shown in connection with reference number 640, the UE 120 may utilize the same process with respect to an additional dynamic PDCCH communication that the UE 120 may receive (e.g., after switching to a different beam, and/or the like).

As indicated above, FIG. 6 is provided as an example. Other examples may differ from what is described with respect to FIG. 6.

Figure 7:
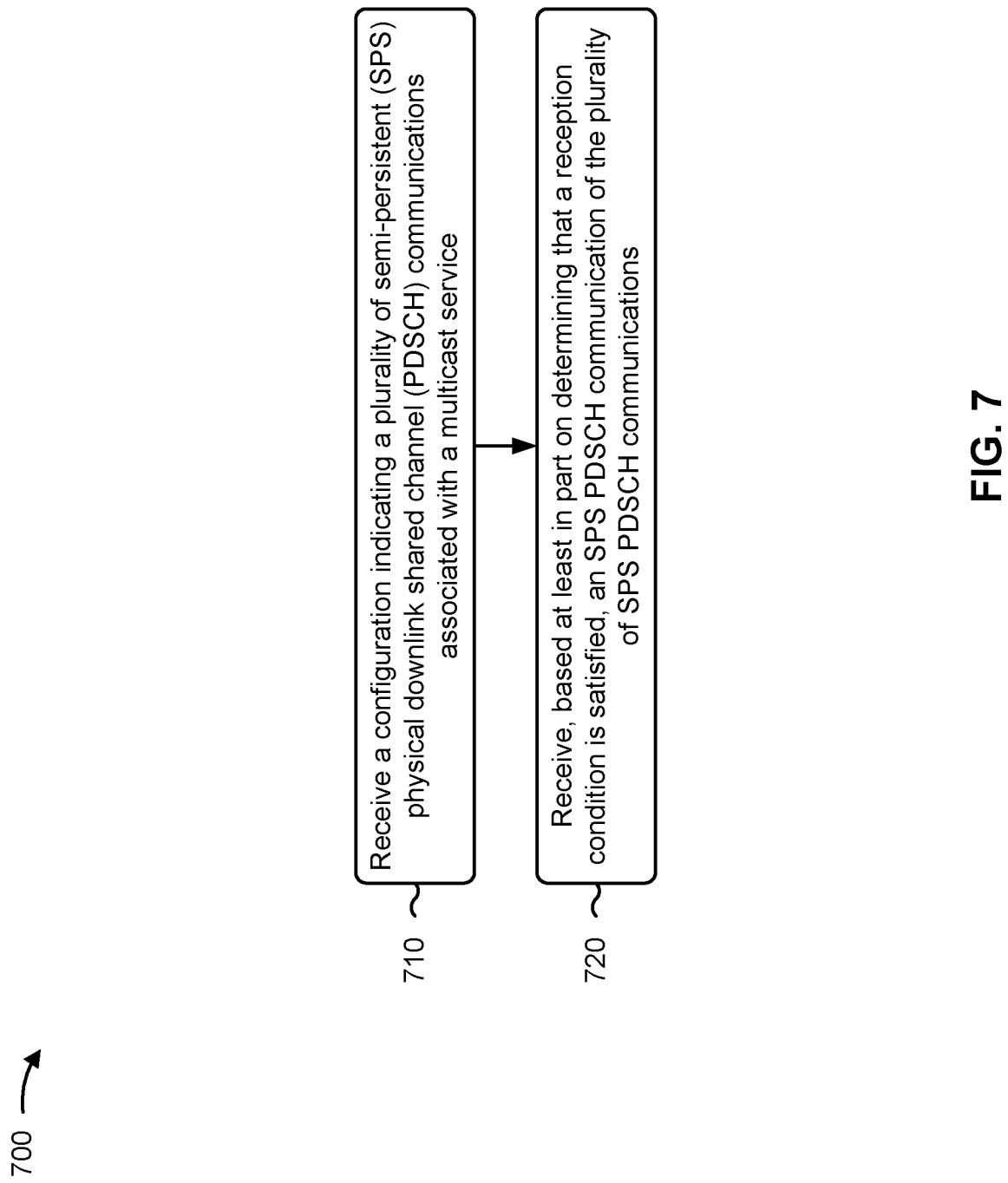
FIGS. 7 and 8 are diagrams illustrating example processes associated with SPS PDSCHs for NR multicast, in accordance with the present disclosure.

FIG. 7 is a diagram illustrating an example process 700 performed, for example, by a UE, in accordance with the present disclosure. Example process 700 is an example where the UE (e.g., UE 120) performs operations associated with SPS PDSCHs for NR multicast.

As shown in FIG. 7, in some aspects, process 700 may include receiving a configuration indicating a plurality of SPS PDSCH communications associated with a multicast service (block 710). For example, the UE (e.g., using reception component 902 of FIG. 9) may receive a configuration indicating a plurality of SPS PDSCH communications associated with a multicast service, as described above.

As further shown in FIG. 7, in some aspects, process 700 may include receiving, based at least in part on determining that a reception condition is satisfied, an SPS PDSCH communication of the plurality of SPS PDSCH communications (block 720). For example, the UE (e.g., using reception component 902 of FIG. 9) may receive, based at least in part on determining that a reception condition is satisfied, an SPS PDSCH communication of the plurality of SPS PDSCH communications, as described above.

Process 700 may include additional aspects, such as any single aspect or any combination of aspects described below and/or in connection with one or more other processes described elsewhere herein.

In a first aspect, process 700 includes transmitting ACK/NACK feedback corresponding to the SPS PDSCH communication.

In a second aspect, alone or in combination with the first aspect, transmitting the ACK/NACK feedback comprises transmitting the ACK/NACK feedback on a PUCCH resource associated with the SPS PDSCH communication.

In a third aspect, alone or in combination with one or more of the first and second aspects, process 700 includes receiving a plurality of SPS PDSCH communication activation indications corresponding to the plurality of SPS PDSCH communications.

In a fourth aspect, alone or in combination with one or more of the first through third aspects, the plurality of SPS PDSCH communication activation indications indicate a plurality of beams associated with the plurality of SPS PDSCH communications, and the SPS PDSCH communication is associated with a beam of the plurality of beams.

In a fifth aspect, alone or in combination with one or more of the first through fourth aspects, the plurality of SPS PDSCH communication activation indications are carried in at least one activation DCI communication.

In a sixth aspect, alone or in combination with one or more of the first through fifth aspects, the at least one activation DCI communication comprises a CRC that is scrambled using an RNTI.

In a seventh aspect, alone or in combination with one or more of the first through sixth aspects, the RNTI comprises a G-RNTI or a GS-RNTI.

In an eighth aspect, alone or in combination with one or more of the first through seventh aspects, the G-RNTI or the GS-RNTI corresponds to the multicast service, and an additional G-RNTI or an additional GS-RNTI corresponds to an additional multicast service.

In a ninth aspect, alone or in combination with one or more of the first through eighth aspects, the RNTI is not a C-RNTI or a CS-RNTI.

In a tenth aspect, alone or in combination with one or more of the first through ninth aspects, the at least one activation DCI communication comprises a plurality of activation DCI communications.

In an eleventh aspect, alone or in combination with one or more of the first through tenth aspects, a first activation DCI communication of the plurality of activation DCI communications carries a first SPS PDSCH communication activation indication of the plurality of SPS PDSCH communication activation indications, and a second activation DCI communication of the plurality of activation DCI communications carries a second SPS PDSCH communication activation indication of the plurality of SPS PDSCH communication activation indications.

In a twelfth aspect, alone or in combination with one or more of the first through eleventh aspects, the plurality of activation DCI communications indicate a plurality of TCI states associated with the plurality of SPS PDSCH communication activation indications.

In a thirteenth aspect, alone or in combination with one or more of the first through twelfth aspects, a first activation DCI communication of the plurality of activation DCI communications indicates a first TCI state associated with a first SPS PDSCH communication of the plurality of SPS PDSCH communications, and a second activation DCI communication of the plurality of activation DCI communications indicates a second TCI state associated with a second SPS PDSCH communication of the plurality of SPS PDSCH communications.

In a fourteenth aspect, alone or in combination with one or more of the first through thirteenth aspects, the plurality of activation DCI communications indicate a plurality of resource allocations associated with the plurality of SPS PDSCH communications.

In a fifteenth aspect, alone or in combination with one or more of the first through fourteenth aspects, a first activation DCI communication of the plurality of activation DCI communications indicates a first resource allocation of the plurality of resource allocations, and a second activation DCI communication of the plurality of activation DCI indications indicates a second resource allocation of the plurality of resource allocations.

In a sixteenth aspect, alone or in combination with one or more of the first through fifteenth aspects, the plurality of resource allocations comprise at least one of a time domain resource allocation or a frequency domain resource allocation.

In a seventeenth aspect, alone or in combination with one or more of the first through sixteenth aspects, the at least one activation DCI communication comprises an activation DCI communication that carries the plurality of SPS PDSCH communication activation indications.

In an eighteenth aspect, alone or in combination with one or more of the first through seventeenth aspects, the activation DCI communication indicates a plurality of TCI states associated with the plurality of SPS PDSCH communication activation indications.

In a nineteenth aspect, alone or in combination with one or more of the first through eighteenth aspects, the activation DCI communication indicates a plurality of resource allocations associated with the plurality of SPS PDSCH communications.

In a twentieth aspect, alone or in combination with one or more of the first through nineteenth aspects, the plurality of resource allocations comprise at least one of a time domain resource allocation or a frequency domain resource allocation.

In a twenty-first aspect, alone or in combination with one or more of the first through twentieth aspects, the configuration indicates a plurality of resource allocations associated with the plurality of SPS PDSCH communications.

In a twenty-second aspect, alone or in combination with one or more of the first through twenty-first aspects, the plurality of resource allocations comprise at least one of a time domain resource allocation or a frequency domain resource allocation.

In a twenty-third aspect, alone or in combination with one or more of the first through twenty-second aspects, the configuration is carried in an RRC message.

In a twenty-fourth aspect, alone or in combination with one or more of the first through twenty-third aspects, process 700 includes determining that the reception condition is satisfied based at least in part on a TCI state associated with the SPS PDSCH communication.

In a twenty-fifth aspect, alone or in combination with one or more of the first through twenty-fourth aspects, process 700 includes receiving a dynamic PDCCH communication that schedules a dynamic PDSCH communication, where a first TCI state is associated with the dynamic PDSCH communication, storing the first TCI state in a memory, and determining that the reception condition is satisfied based at least in part on a relationship between the first TCI state and a second TCI state, where the second TCI state is associated with the SPS PDSCH communication.

In a twenty-sixth aspect, alone or in combination with one or more of the first through twenty-fifth aspects, determining that the reception condition is satisfied comprises determining that the first TCI state matches the second TCI state.

In a twenty-seventh aspect, alone or in combination with one or more of the first through twenty-sixth aspects, determining that the reception condition is satisfied comprises determining that the first TCI state is different than the second TCI state, and determining that a source SSB corresponding to the first TCI state corresponds to the second TCI state.

In a twenty-eighth aspect, alone or in combination with one or more of the first through twenty-seventh aspects, process 700 includes determining that the SPS PDSCH communication satisfies the reception condition, determining that an additional SPS PDSCH communication satisfies the reception condition, and selecting the SPS PDSCH communication to be received.

In a twenty-ninth aspect, alone or in combination with one or more of the first through twenty-eighth aspects, selecting the SPS PDSCH communication comprises selecting the SPS PDSCH communication based at least in part on determining that the SPS PDSCH communication is scheduled to be transmitted before the additional SPS PDSCH communication.

In a thirtieth aspect, alone or in combination with one or more of the first through twenty-ninth aspects, determining that the reception condition is satisfied is based at least in part on a TCI state associated with a CORESET that is associated with a search space set.

In a thirty-first aspect, alone or in combination with one or more of the first through thirtieth aspects, the search space set carries an activation DCI transmission that carries an SPS PDSCH communication activation indication corresponding to the SPS PDSCH communication.

In a thirty-second aspect, alone or in combination with one or more of the first through thirty-first aspects, process 700 includes monitoring the search space set for a PDCCH in a first slot that occurs before a second slot, where the SPS PDSCH communication is associated with the second slot, and where determining that the reception condition is satisfied comprises determining that the search space set is associated with the first slot.

In a thirty-third aspect, alone or in combination with one or more of the first through thirty-second aspects, process 700 includes receiving an additional configuration indicating an additional plurality of SPS PDSCH communications associated with an additional multicast service.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
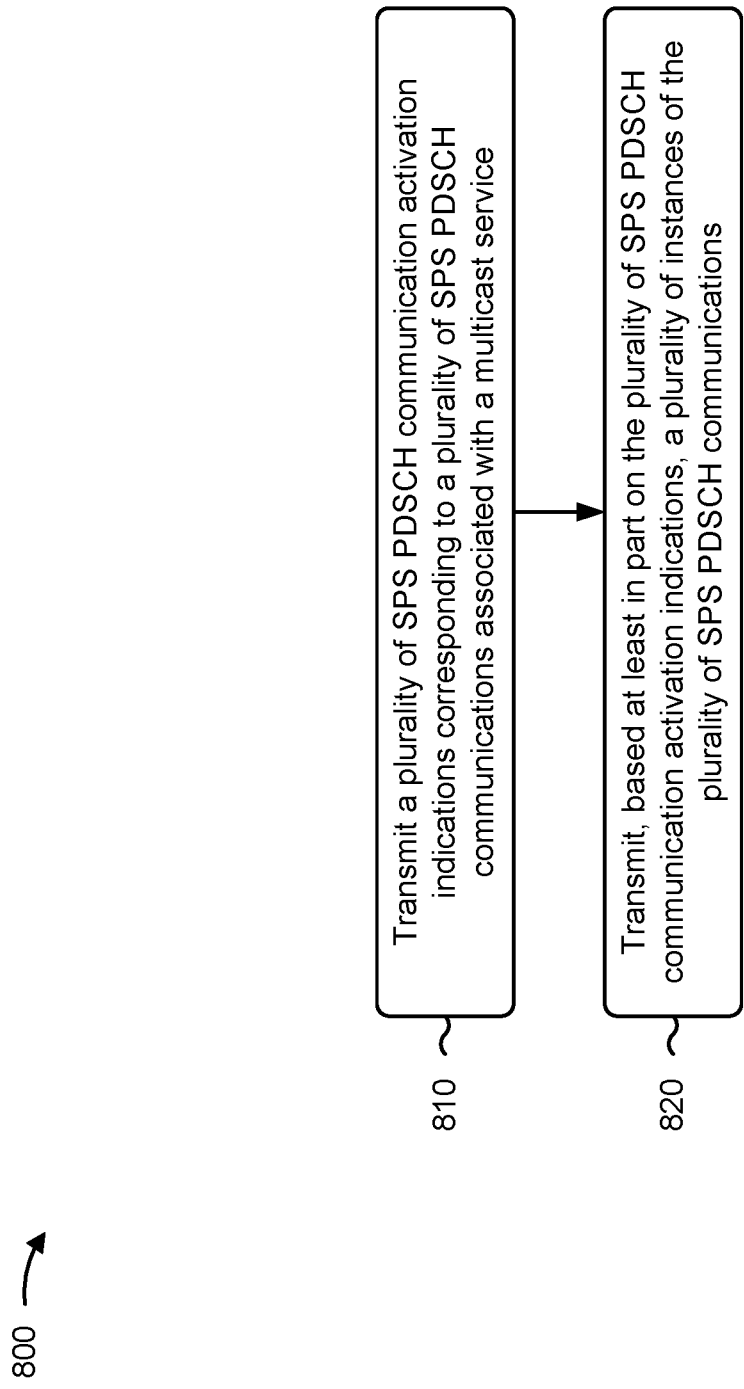

FIG. 8 is a diagram illustrating an example process 800 performed, for example, by a base station, in accordance with the present disclosure. Example process 800 is an example where the base station (e.g., base station 110) performs operations associated with SPS PDSCHs for NR multicast.

As shown in FIG. 8, in some aspects, process 800 may include transmitting a plurality of SPS PDSCH communication activation indications corresponding to a plurality of SPS PDSCH communications associated with a multicast service (block 810). For example, the base station (e.g., using transmission component 1004 of FIG. 10) may transmit a plurality of SPS PDSCH communication activation indications corresponding to a plurality of SPS PDSCH communications associated with a multicast service, as described above.

As further shown in FIG. 8, in some aspects, process 800 may include transmitting, based at least in part on the plurality of SPS PDSCH communication activation indications, a plurality of instances of the plurality of SPS PDSCH communications (block 820). For example, the base station (e.g., using transmission component 1004 of FIG. 10) may transmit, based at least in part on the plurality of SPS PDSCH communication activation indications, a plurality of instances of the plurality of SPS PDSCH communications, as described above.

Process 800 may include additional aspects, such as any single aspect or any combination of aspects described below and/or in connection with one or more other processes described elsewhere herein.

In a first aspect, process 800 includes receiving ACK/NACK feedback corresponding to at least one SPS PDSCH communication of the plurality of SPS PDSCH communications.

In a second aspect, alone or in combination with the first aspect, receiving the ACK/NACK feedback comprises receiving the ACK/NACK feedback on a PUCCH resource associated with the SPS PDSCH communication.

In a third aspect, alone or in combination with one or more of the first and second aspects, the plurality of SPS PDSCH communication activation indications indicate a plurality of beams associated with the plurality of SPS PDSCH communications, and where a first SPS PDSCH communication of the plurality of SPS PDSCH communications is associated with a first beam of the plurality of beams, and a second SPS PDSCH communication of the plurality of SPS PDSCH communications is associated with a second beam of the plurality of beams.

In a fourth aspect, alone or in combination with one or more of the first through third aspects, transmitting the plurality of instances of the plurality of SPS PDSCH communications comprises transmitting, based at least in part on the plurality of SPS PDSCH communication activation indications, a first instance of the plurality of SPS PDSCH communications while a UE is associated with the first beam, and transmitting, based at least in part on the plurality of SPS PDSCH communication activation indications, a second instance of the plurality of SPS PDSCH communications while the UE is associated with the second beam.

In a fifth aspect, alone or in combination with one or more of the first through fourth aspects, the plurality of SPS PDSCH communication activation indications are carried in at least one activation DCI communication.

In a sixth aspect, alone or in combination with one or more of the first through fifth aspects, the at least one activation DCI communication comprises a CRC that is scrambled using an RNTI.

In a seventh aspect, alone or in combination with one or more of the first through sixth aspects, the RNTI comprises a G-RNTI or a GS-RNTI.

In an eighth aspect, alone or in combination with one or more of the first through seventh aspects, the G-RNTI or the GS-RNTI corresponds to the multicast service, and wherein an additional G-RNTI or an additional GS-RNTI corresponds to an additional multicast service.

In a ninth aspect, alone or in combination with one or more of the first through eighth aspects, the RNTI is not a C-RNTI or a CS-RNTI.

In a tenth aspect, alone or in combination with one or more of the first through ninth aspects, the at least one activation DCI communication comprises a plurality of activation DCI communications.

In an eleventh aspect, alone or in combination with one or more of the first through tenth aspects, a first activation DCI communication of the plurality of activation DCI communications carries a first SPS PDSCH communication activation indication of the plurality of SPS PDSCH communication activation indications, and a second activation DCI communication of the plurality of activation DCI communications carries a second SPS PDSCH communication activation indication of the plurality of SPS PDSCH communication activation indications.

In a twelfth aspect, alone or in combination with one or more of the first through eleventh aspects, the plurality of activation DCI communications indicate a plurality of TCI states associated with the plurality of SPS PDSCH communication activation indications.

In a thirteenth aspect, alone or in combination with one or more of the first through twelfth aspects, a first activation DCI communication of the plurality of activation DCI communications indicates a first TCI state associated with a first SPS PDSCH communication of the plurality of SPS PDSCH communications, and a second activation DCI communication of the plurality of activation DCI communications indicates a second TCI state associated with a second SPS PDSCH communication of the plurality of SPS PDSCH communications.

In a fourteenth aspect, alone or in combination with one or more of the first through thirteenth aspects, the plurality of activation DCI communications indicate a plurality of resource allocations associated with the plurality of SPS PDSCH communications.

In a fifteenth aspect, alone or in combination with one or more of the first through fourteenth aspects, a first activation DCI communication of the plurality of activation DCI communications indicates a first resource allocation of the plurality of resource allocations, and a second activation DCI communication of the plurality of activation DCI indications indicates a second resource allocation of the plurality of resource allocations.

In a sixteenth aspect, alone or in combination with one or more of the first through fifteenth aspects, the plurality of resource allocations comprise at least one of a time domain resource allocation or a frequency domain resource allocation.

In a seventeenth aspect, alone or in combination with one or more of the first through sixteenth aspects, the at least one activation DCI communication comprises an activation DCI communication that carries the plurality of SPS PDSCH communication activation indications.

In an eighteenth aspect, alone or in combination with one or more of the first through seventeenth aspects, the activation DCI communication indicates a plurality of TCI states associated with the plurality of SPS PDSCH communication activation indications.

In a nineteenth aspect, alone or in combination with one or more of the first through eighteenth aspects, the activation DCI communication indicates a plurality of resource allocations associated with the plurality of SPS PDSCH communications.

In a twentieth aspect, alone or in combination with one or more of the first through nineteenth aspects, the plurality of resource allocations comprise at least one of a time domain resource allocation or a frequency domain resource allocation.

In a twenty-first aspect, alone or in combination with one or more of the first through twentieth aspects, process 800 includes transmitting a configuration indicating the plurality of SPS PDSCH communications.

In a twenty-second aspect, alone or in combination with one or more of the first through twenty-first aspects, the configuration indicates a plurality of resource allocations associated with the plurality of SPS PDSCH communications.

In a twenty-third aspect, alone or in combination with one or more of the first through twenty-second aspects, the plurality of resource allocations comprise at least one of a time domain resource allocation or a frequency domain resource allocation.

In a twenty-fourth aspect, alone or in combination with one or more of the first through twenty-third aspects, the configuration is carried in an RRC message.

In a twenty-fifth aspect, alone or in combination with one or more of the first through twenty-fourth aspects, process 800 includes transmitting an additional configuration indicating an additional plurality of SPS PDSCH communications associated with an additional multicast service.

In a twenty-sixth aspect, alone or in combination with one or more of the first through twenty-fifth aspects, process 800 includes transmitting a dynamic PDCCH communication that schedules a dynamic PDSCH communication, where a first TCI state is associated with the dynamic PDSCH communication, and where the first TCI state matches a second TCI state, where the second TCI state is associated with a SPS PDSCH communication of the plurality of SPS PDSCH communications.

In a twenty-seventh aspect, alone or in combination with one or more of the first through twenty-sixth aspects, process 800 includes transmitting a dynamic PDCCH communication that schedules a dynamic PDSCH communication, where a first TCI state associated with the dynamic PDSCH communication is different than a second TCI state, where the second TCI state is associated with a SPS PDSCH communication of the plurality of SPS PDSCH communications, and where a source SSB corresponding to the first TCI state corresponds to the second TCI state.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
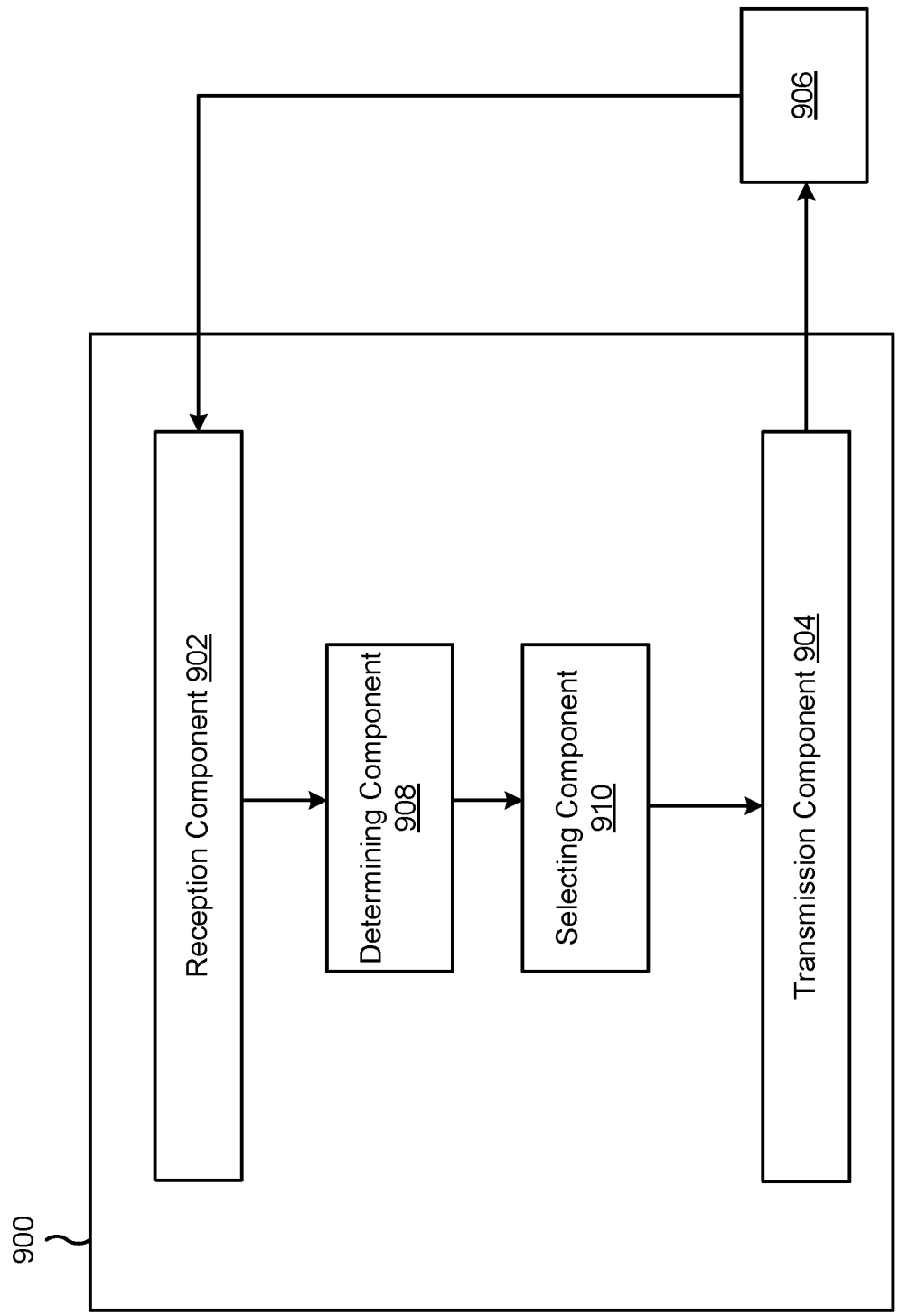
FIGS. 9 and 10 are block diagrams of example apparatuses for wireless communication, in accordance with the present disclosure.

FIG. 9 is a block diagram of an example apparatus 900 for wireless communication. The apparatus 900 may be a UE, or a UE may include the apparatus 900. In some aspects, the apparatus 900 includes a reception component 902 and a transmission component 904, which may be in communication with one another (for example, via one or more buses and/or one or more other components). As shown, the apparatus 900 may communicate with another apparatus 906 (such as a UE, a base station, or another wireless communication device) using the reception component 902 and the transmission component 904. As further shown, the apparatus 900 may include one or more of a determining component 908, or a selecting component 910, among other examples.

In some aspects, the apparatus 900 may be configured to perform one or more operations described herein in connection with FIGS. 4-6. Additionally, or alternatively, the apparatus 900 may be configured to perform one or more processes described herein, such as process 700 of FIG. 7. In some aspects, the apparatus 900 and/or one or more components shown in FIG. 9 may include one or more components of the UE described above in connection with FIG. 2. Additionally, or alternatively, one or more components shown in FIG. 9 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 902 may receive communications, such as reference signals, control information, data communications, or a combination thereof, from the apparatus 906. The reception component 902 may provide received communications to one or more other components of the apparatus 900. In some aspects, the reception component 902 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 906. In some aspects, the reception component 902 may include one or more antennas, a demodulator, a MIMO detector, a receive processor, a controller/processor, a memory, or a combination thereof, of the UE described above in connection with FIG. 2.

The transmission component 904 may transmit communications, such as reference signals, control information, data communications, or a combination thereof, to the apparatus 906. In some aspects, one or more other components of the apparatus 906 may generate communications and may provide the generated communications to the transmission component 904 for transmission to the apparatus 906. In some aspects, the transmission component 904 may perform signal processing on the generated communications (such as filtering, amplification, modulation, digital-to-analog conversion, multiplexing, interleaving, mapping, or encoding, among other examples), and may transmit the processed signals to the apparatus 906. In some aspects, the transmission component 904 may include one or more antennas, a modulator, a transmit MIMO processor, a transmit processor, a controller/processor, a memory, or a combination thereof, of the UE described above in connection with FIG. 2. In some aspects, the transmission component 904 may be collocated with the reception component 902 in a transceiver.

The reception component 902 may receive a configuration indicating a plurality of SPS PDSCH communications associated with a multicast service. The reception component 902 may receive, based at least in part on determining that a reception condition is satisfied, an SPS PDSCH communication of the plurality of SPS PDSCH communications.

The determining component 908 may include a memory. In some aspects, the determining component 908 may include one or more antennas, a demodulator, a MIMO detector, a receive processor, a modulator, a transmit MIMO processor, a transmit processor, a controller/processor, a memory, or a combination thereof, of the UE described above in connection with FIG. 2. The determining component 908 may include one or more processors coupled with the memory, the memory and the one or more processors configured to determine whether an SPS PDSCH communication satisfies a reception condition.

The selecting component 910 may include a memory. In some aspects, the selecting component 910 may include one or more antennas, a demodulator, a MIMO detector, a receive processor, a modulator, a transmit MIMO processor, a transmit processor, a controller/processor, a memory, or a combination thereof, of the UE described above in connection with FIG. 2. The selecting component 910 may include one or more processors coupled with the memory, the memory and the one or more processors configured to select the SPS PDSCH communication to be received.

The number and arrangement of components shown in FIG. 9 are provided as an example. In practice, there may be additional components, fewer components, different components, or differently arranged components than those shown in FIG. 9. Furthermore, two or more components shown in FIG. 9 may be implemented within a single component, or a single component shown in FIG. 9 may be implemented as multiple, distributed components. Additionally, or alternatively, a set of (one or more) components shown in FIG. 9 may perform one or more functions described as being performed by another set of components shown in FIG. 9.

Figure 10:
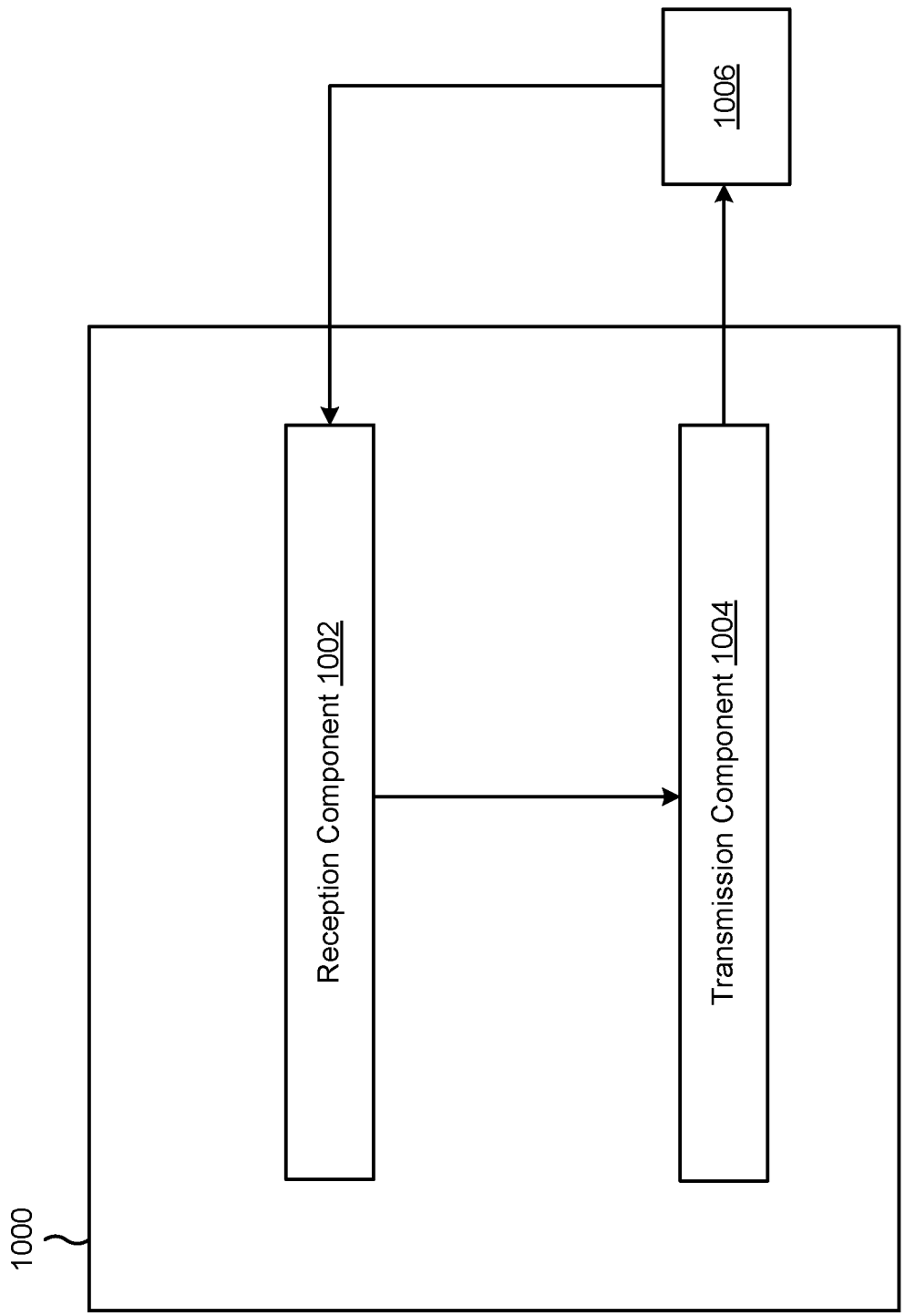

FIG. 10 is a block diagram of an example apparatus 1000 for wireless communication. The apparatus 1000 may be a base station, or a base station may include the apparatus 1000. In some aspects, the apparatus 1000 includes a reception component 1002 and a transmission component 1004, which may be in communication with one another (for example, via one or more buses and/or one or more other components). As shown, the apparatus 1000 may communicate with another apparatus 1006 (such as a UE, a base station, or another wireless communication device) using the reception component 1002 and the transmission component 1004.

In some aspects, the apparatus 1000 may be configured to perform one or more operations described herein in connection with FIGS. 4-6. Additionally, or alternatively, the apparatus 1000 may be configured to perform one or more processes described herein, such as process 800 of FIG. 8. In some aspects, the apparatus 1000 and/or one or more components shown in FIG. 10 may include one or more components of the base station described above in connection with FIG. 2. Additionally, or alternatively, one or more components shown in FIG. 10 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1002 may receive communications, such as reference signals, control information, data communications, or a combination thereof, from the apparatus 1006. The reception component 1002 may provide received communications to one or more other components of the apparatus 1000. In some aspects, the reception component 1002 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1006. In some aspects, the reception component 1002 may include one or more antennas, a demodulator, a MIMO detector, a receive processor, a controller/processor, a memory, or a combination thereof, of the base station described above in connection with FIG. 2.

The transmission component 1004 may transmit communications, such as reference signals, control information, data communications, or a combination thereof, to the apparatus 1006. In some aspects, one or more other components of the apparatus 1006 may generate communications and may provide the generated communications to the transmission component 1004 for transmission to the apparatus 1006. In some aspects, the transmission component 1004 may perform signal processing on the generated communications (such as filtering, amplification, modulation, digital-to-analog conversion, multiplexing, interleaving, mapping, or encoding, among other examples), and may transmit the processed signals to the apparatus 1006. In some aspects, the transmission component 1004 may include one or more antennas, a modulator, a transmit MIMO processor, a transmit processor, a controller/processor, a memory, or a combination thereof, of the base station described above in connection with FIG. 2. In some aspects, the transmission component 1004 may be collocated with the reception component 1002 in a transceiver.

The transmission component 1004 may transmit a plurality of SPS PDSCH communication activation indications corresponding to a plurality of SPS PDSCH communications associated with a multicast service. The transmission component 1004 may transmit, based at least in part on the plurality of SPS PDSCH communication activation indications, a plurality of instances of the plurality of SPS PDSCH communications.

The number and arrangement of components shown in FIG. 10 are provided as an example. In practice, there may be additional components, fewer components, different components, or differently arranged components than those shown in FIG. 10. Furthermore, two or more components shown in FIG. 10 may be implemented within a single component, or a single component shown in FIG. 10 may be implemented as multiple, distributed components. Additionally, or alternatively, a set of (one or more) components shown in FIG. 10 may perform one or more functions described as being performed by another set of components shown in FIG. 10.

The following provides an overview of some Aspects of the present disclosure:

Aspect 1: A method of wireless communication performed by a user equipment (UE), comprising: receiving a configuration indicating a plurality of semi-persistent scheduling (SPS) physical downlink shared channel (PDSCH) communications associated with a multicast service; and receiving, based at least in part on determining that a reception condition is satisfied, an SPS PDSCH communication of the plurality of SPS PDSCH communications.

Aspect 2: The method of Aspect 1, further comprising transmitting acknowledgment or negative acknowledgement (ACK/NACK) feedback corresponding to the SPS PDSCH communication.

Aspect 3: The method of Aspect 2, wherein transmitting the ACK/NACK feedback comprises transmitting the ACK/NACK feedback on at least one of a physical uplink control channel resource associated with the SPS PDSCH communication or a physical uplink shared channel.

Aspect 4: The method of any of Aspects 1-3, further comprising receiving a plurality of SPS PDSCH communication activation indications corresponding to the plurality of SPS PDSCH communications.

Aspect 5: The method of Aspect 4, wherein the plurality of SPS PDSCH communication activation indications indicate a plurality of beams associated with the plurality of SPS PDSCH communications, and wherein the SPS PDSCH communication is associated with a beam of the plurality of beams.

Aspect 6: The method of either of Aspects 4 or 5, wherein the plurality of SPS PDSCH communication activation indications are carried in at least one activation downlink control information (DCI) communication.

Aspect 7: The method of Aspect 6, wherein the at least one activation DCI communication comprises a cyclic redundancy check that is scrambled using a radio network temporary identifier (RNTI).

Aspect 8: The method of Aspect 7, wherein the RNTI comprises a group RNTI (G-RNTI) or a group scheduling RNTI (GS-RNTI).

Aspect 9: The method of Aspect 8, wherein the G-RNTI or the GS-RNTI corresponds to the multicast service, and wherein an additional G-RNTI or an additional GS-RNTI corresponds to an additional multicast service.

Aspect 10: The method of any of Aspects 7-9, wherein the RNTI is not a cell RNTI or a configured scheduling RNTI.

Aspect 11: The method of any of Aspects 6-10, wherein the at least one activation DCI communication comprises a plurality of activation DCI communications.

Aspect 12: The method of Aspect 11, wherein a first activation DCI communication of the plurality of activation DCI communications carries a first SPS PDSCH communication activation indication of the plurality of SPS PDSCH communication activation indications, and wherein a second activation DCI communication of the plurality of activation DCI communications carries a second SPS PDSCH communication activation indication of the plurality of SPS PDSCH communication activation indications.

Aspect 13: The method of either of Aspects 11 or 12, wherein the plurality of activation DCI communications indicate a plurality of transmission configuration indicator (TCI) states associated with the plurality of SPS PDSCH communication activation indications.

Aspect 14: The method of Aspect 13, wherein a first activation DCI communication of the plurality of activation DCI communications indicates a first TCI state associated with a first SPS PDSCH communication of the plurality of SPS PDSCH communications, and wherein a second activation DCI communication of the plurality of activation DCI communications indicates a second TCI state associated with a second SPS PDSCH communication of the plurality of SPS PDSCH communications.

Aspect 15: The method of any of Aspects 11-14, wherein the plurality of activation DCI communications indicate a plurality of resource allocations associated with the plurality of SPS PDSCH communications.

Aspect 16: The method of Aspect 15, wherein a first activation DCI communication of the plurality of activation DCI communications indicates a first resource allocation of the plurality of resource allocations, and wherein a second activation DCI communication of the plurality of activation DCI indications indicates a second resource allocation of the plurality of resource allocations.

Aspect 17: The method of either of Aspects 15 or 16, wherein the plurality of resource allocations comprise at least one of a time domain resource allocation or a frequency domain resource allocation.

Aspect 18: The method of any of Aspects 6-17, wherein the at least one activation DCI communication comprises an activation DCI communication that carries the plurality of SPS PDSCH communication activation indications.

Aspect 19: The method of Aspect 18, wherein the activation DCI communication indicates a plurality of transmission configuration indicator (TCI) states associated with the plurality of SPS PDSCH communication activation indications.

Aspect 20: The method of either of Aspects 18 or 19, wherein the activation DCI communication indicates a plurality of resource allocations associated with the plurality of SPS PDSCH communications.

Aspect 21: The method of Aspect 20, wherein the plurality of resource allocations comprise at least one of a time domain resource allocation or a frequency domain resource allocation.

Aspect 22: The method of any of Aspects 1-21, wherein the configuration indicates a plurality of resource allocations associated with the plurality of SPS PDSCH communications.

Aspect 23: The method of Aspect 22, wherein the plurality of resource allocations comprise at least one of a time domain resource allocation or a frequency domain resource allocation.

Aspect 24: The method of either of Aspects 22 or 23, wherein the configuration is carried in a radio resource control message.

Aspect 25: The method of any of Aspects 1-24, further comprising determining that the reception condition is satisfied based at least in part on a transmission configuration indicator (TCI) state associated with the SPS PDSCH communication.

Aspect 26: The method of any of Aspects 1-25, further comprising: receiving a dynamic physical downlink control channel (PDCCH) communication that schedules a dynamic PDSCH communication, wherein a first transmission configuration indicator (TCI) state is associated with the dynamic PDSCH communication; storing the first TCI state in a memory; and determining that the reception condition is satisfied based at least in part on a relationship between the first TCI state and a second TCI state, wherein the second TCI state is associated with the SPS PDSCH communication.

Aspect 27: The method of Aspect 26, wherein determining that the reception condition is satisfied comprises determining that the first TCI state matches the second TCI state.

Aspect 28: The method of Aspect 26, wherein determining that the reception condition is satisfied comprises: determining that the first TCI state is different than the second TCI state; and determining that a source synchronization signal block (SSB) corresponding to the first TCI state corresponds to the second TCI state.

Aspect 29: The method of any of Aspects 1-28, further comprising: determining that the SPS PDSCH communication satisfies the reception condition; determining that an additional SPS PDSCH communication satisfies the reception condition; and selecting the SPS PDSCH communication to be received.

Aspect 30: The method of Aspect 29, wherein selecting the SPS PDSCH communication comprises selecting the SPS PDSCH communication based at least in part on determining that the SPS PDSCH communication is scheduled to be transmitted before the additional SPS PDSCH communication.

Aspect 31: The method of any of Aspects 1-30, wherein determining that the reception condition is satisfied is based at least in part on a transmission configuration indicator (TCI) state associated with a control resource set (CORESET) that is associated with a search space set.

Aspect 32: The method of Aspect 31, wherein the search space set carries an activation downlink control information transmission that carries an SPS PDSCH communication activation indication corresponding to the SPS PDSCH communication.

Aspect 33: The method of either of Aspects 31 or 32, further comprising: monitoring the search space set for a physical downlink control channel in a first slot that occurs before a second slot, wherein the SPS PDSCH communication is associated with the second slot, and wherein determining that the reception condition is satisfied comprises determining that the search space set is associated with the first slot. wherein determining that the reception condition is satisfied comprises determining that the search space set is associated with the first slot.

Aspect 34: The method of any of Aspects 1-33, further comprising receiving an additional configuration indicating an additional plurality of SPS PDSCH communications associated with an additional multicast service.

Aspect 35: A method of wireless communication performed by a base station, comprising: transmitting a plurality of semi-persistent scheduling (SPS) physical downlink shared channel (PDSCH) communication activation indications corresponding to a plurality of SPS PDSCH communications associated with a multicast service; and transmitting, based at least in part on the plurality of SPS PDSCH communication activation indications, a plurality of instances of the plurality of SPS PDSCH communications.

Aspect 36: The method of Aspect 35, further comprising receiving acknowledgment or negative acknowledgement (ACK/NACK) feedback corresponding to at least one SPS PDSCH communication of the plurality of SPS PDSCH communications.

Aspect 37: The method of Aspect 36, wherein receiving the ACK/NACK feedback comprises receiving the ACK/NACK feedback on a physical uplink control channel resource associated with the SPS PDSCH communication.

Aspect 38: The method of any of Aspects 35-37, wherein the plurality of SPS PDSCH communication activation indications indicate a plurality of beams associated with the plurality of SPS PDSCH communications, and wherein a first SPS PDSCH communication of the plurality of SPS PDSCH communications is associated with a first beam of the plurality of beams, and wherein a second SPS PDSCH communication of the plurality of SPS PDSCH communications is associated with a second beam of the plurality of beams.

Aspect 39: The method of Aspect 38, wherein transmitting the plurality of instances of the plurality of SPS PDSCH communications comprises: transmitting, based at least in part on the plurality of SPS PDSCH communication activation indications, a first instance of the plurality of SPS PDSCH communications while a user equipment (UE) is associated with the first beam; and transmitting, based at least in part on the plurality of SPS PDSCH communication activation indications, a second instance of the plurality of SPS PDSCH communications while the UE is associated with the second beam.

Aspect 40: The method of any of Aspects 35-39, wherein the plurality of SPS PDSCH communication activation indications are carried in at least one activation downlink control information (DCI) communication.

Aspect 41: The method of Aspect 40, wherein the at least one activation DCI communication comprises a cyclic redundancy check that is scrambled using a radio network temporary identifier (RNTI).

Aspect 42: The method of Aspect 41, wherein the RNTI comprises a group RNTI (G-RNTI) or a group scheduling RNTI (GS-RNTI).

Aspect 43: The method of Aspect 42, wherein the G-RNTI or the GS-RNTI corresponds to the multicast service, and wherein an additional G-RNTI or an additional GS-RNTI corresponds to an additional multicast service.

Aspect 44: The method of either of Aspects 42 or 43, wherein the RNTI is not a cell RNTI or a configured scheduling RNTI.

Aspect 45: The method of any of Aspects 40-44, wherein the at least one activation DCI communication comprises a plurality of activation DCI communications.

Aspect 46: The method of Aspect 45, wherein a first activation DCI communication of the plurality of activation DCI communications carries a first SPS PDSCH communication activation indication of the plurality of SPS PDSCH communication activation indications, and wherein a second activation DCI communication of the plurality of activation DCI communications carries a second SPS PDSCH communication activation indication of the plurality of SPS PDSCH communication activation indications.

Aspect 47: The method of either of Aspects 45 or 46, wherein the plurality of activation DCI communications indicate a plurality of transmission configuration indicator (TCI) states associated with the plurality of SPS PDSCH communication activation indications.

Aspect 48: The method of Aspect 47, wherein a first activation DCI communication of the plurality of activation DCI communications indicates a first TCI state associated with a first SPS PDSCH communication of the plurality of SPS PDSCH communications, and wherein a second activation DCI communication of the plurality of activation DCI communications indicates a second TCI state associated with a second SPS PDSCH communication of the plurality of SPS PDSCH communications.

Aspect 49: The method of any of Aspects 45-48, wherein the plurality of activation DCI communications indicate a plurality of resource allocations associated with the plurality of SPS PDSCH communications.

Aspect 50: The method of Aspect 49, wherein a first activation DCI communication of the plurality of activation DCI communications indicates a first resource allocation of the plurality of resource allocations, and wherein a second activation DCI communication of the plurality of activation DCI indications indicates a second resource allocation of the plurality of resource allocations.

Aspect 51: The method of either of Aspects 49 or 50, wherein the plurality of resource allocations comprise at least one of a time domain resource allocation or a frequency domain resource allocation.

Aspect 52: The method of any of Aspects 40-51, wherein the at least one activation DCI communication comprises an activation DCI communication that carries the plurality of SPS PDSCH communication activation indications.

Aspect 53: The method of Aspect 52, wherein the activation DCI communication indicates a plurality of transmission configuration indicator (TCI) states associated with the plurality of SPS PDSCH communication activation indications.

Aspect 54: The method of either of Aspects 52 or 53, wherein the activation DCI communication indicates a plurality of resource allocations associated with the plurality of SPS PDSCH communications.

Aspect 55: The method of Aspect 54, wherein the plurality of resource allocations comprise at least one of a time domain resource allocation or a frequency domain resource allocation.

Aspect 56: The method of any of Aspects 35-55, further comprising transmitting a configuration indicating the plurality of SPS PDSCH communications.

Aspect 57: The method of Aspect 56, wherein the configuration indicates a plurality of resource allocations associated with the plurality of SPS PDSCH communications.

Aspect 58: The method of Aspect 57, wherein the plurality of resource allocations comprise at least one of a time domain resource allocation or a frequency domain resource allocation.

Aspect 59: The method of either of Aspects 57 or 58, wherein the configuration is carried in a radio resource control message.

Aspect 60: The method of any of Aspects 56-59, further comprising transmitting an additional configuration indicating an additional plurality of SPS PDSCH communications associated with an additional multicast service.

Aspect 61: The method of any of Aspects 35-60, further comprising: transmitting a dynamic physical downlink control channel (PDCCH) communication that schedules a dynamic PDSCH communication, wherein a first transmission configuration indicator (TCI) state is associated with the dynamic PDSCH communication, and wherein the first TCI state matches a second TCI state, wherein the second TCI state is associated with a SPS PDSCH communication of the plurality of SPS PDSCH communications.

Aspect 62: The method of any of Aspects 35-61, further comprising: transmitting a dynamic physical downlink control channel (PDCCH) communication that schedules a dynamic PDSCH communication, wherein a first transmission configuration indicator (TCI) state associated with the dynamic PDSCH communication is different than a second TCI state, wherein the second TCI state is associated with a SPS PDSCH communication of the plurality of SPS PDSCH communications, and wherein a source synchronization signal block (SSB) corresponding to the first TCI state corresponds to the second TCI state.

Aspect 63: An apparatus for wireless communication at a device, comprising a processor; memory coupled with the processor; and instructions stored in the memory and executable by the processor to cause the apparatus to perform the method of one or more of Aspects 1-34.

Aspect 64: A device for wireless communication, comprising a memory and one or more processors coupled to the memory, the one or more processors configured to perform the method of one or more of Aspects 1-34.

Aspect 65: An apparatus for wireless communication, comprising at least one means for performing the method of one or more of Aspects 1-34.

Aspect 66: A non-transitory computer-readable medium storing code for wireless communication, the code comprising instructions executable by a processor to perform the method of one or more of Aspects 1-34.

Aspect 67: A non-transitory computer-readable medium storing a set of instructions for wireless communication, the set of instructions comprising one or more instructions that, when executed by one or more processors of a device, cause the device to perform the method of one or more of Aspects 1-34.

Aspect 68: An apparatus for wireless communication at a device, comprising a processor; memory coupled with the processor; and instructions stored in the memory and executable by the processor to cause the apparatus to perform the method of one or more of Aspects 35-62.

Aspect 69: A device for wireless communication, comprising a memory and one or more processors coupled to the memory, the one or more processors configured to perform the method of one or more of Aspects 35-62.

Aspect 70: An apparatus for wireless communication, comprising at least one means for performing the method of one or more of Aspects 35-62.

Aspect 71: A non-transitory computer-readable medium storing code for wireless communication, the code comprising instructions executable by a processor to perform the method of one or more of Aspects 35-62.

Aspect 72: A non-transitory computer-readable medium storing a set of instructions for wireless communication, the set of instructions comprising one or more instructions that, when executed by one or more processors of a device, cause the device to perform the method of one or more of Aspects 35-62.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. An apparatus for wireless communication at a user equipment (UE), comprising:
   a memory; and
   one or more processors, coupled to the memory, configured to:
   receive a configuration indicating a plurality of semi-persistent scheduling (SPS) physical downlink shared channel (PDSCH) communications associated with a multicast service; and
   receive, based at least in part on determining that a reception condition is satisfied, an SPS PDSCH communication of the plurality of SPS PDSCH communications, wherein the reception condition is determined to be satisfied based at least in part on determining that a first transmission configuration indicator (TCI) state associated with a dynamic physical downlink control channel (PDCCH) communication is different than a second TCI state associated with the SPS PDSCH communication and on determining that a source synchronization signal block (SSB) corresponding to the first TCI state corresponds to the second TCI state.

2. The apparatus of claim 1, wherein the one or more processors are further configured to transmit acknowledgment or negative acknowledgement (ACK/NACK) feedback corresponding to the SPS PDSCH communication, wherein transmitting the ACK/NACK feedback comprises transmitting the ACK/NACK feedback on at least one of a physical uplink control channel resource associated with the SPS PDSCH communication or a physical uplink shared channel.

3. The apparatus of claim 1, wherein the one or more processors are further configured to receive a plurality of SPS PDSCH communication activation indications corresponding to the plurality of SPS PDSCH communications.

4. The apparatus of claim 3, wherein the plurality of SPS PDSCH communication activation indications indicate a plurality of beams associated with the plurality of SPS PDSCH communications, and
   wherein the SPS PDSCH communication is associated with a beam of the plurality of beams.

5. The apparatus of claim 3, wherein the plurality of SPS PDSCH communication activation indications are carried in at least one activation downlink control information (DCI) communication.

6. The apparatus of claim 5, wherein the at least one activation DCI communication comprises a cyclic redundancy check that is scrambled using a radio network temporary identifier (RNTI), wherein the RNTI comprises a group RNTI (G-RNTI) or a group scheduling RNTI (GS-RNTI).

7. The apparatus of claim 6, wherein the G-RNTI or the GS-RNTI corresponds to the multicast service, and
wherein an additional G-RNTI or an additional GS-RNTI corresponds to an additional multicast service.

8. The apparatus of claim 6, wherein the RNTI is not a cell RNTI or a configured scheduling RNTI.

9. The apparatus of claim 5, wherein the at least one activation DCI communication comprises a plurality of activation DCI communications.

10. The apparatus of claim 9, wherein a first activation DCI communication of the plurality of activation DCI communications carries a first SPS PDSCH communication activation indication of the plurality of SPS PDSCH communication activation indications, and
wherein a second activation DCI communication of the plurality of activation DCI communications carries a second SPS PDSCH communication activation indication of the plurality of SPS PDSCH communication activation indications.

11. The apparatus of claim 9, wherein the plurality of activation DCI communications indicate a plurality of TCI states associated with the plurality of SPS PDSCH communication activation indications.

12. The apparatus of claim 11, wherein a first activation DCI communication of the plurality of activation DCI communications indicates a TCI state associated with a first SPS PDSCH communication of the plurality of SPS PDSCH communications, and
wherein a second activation DCI communication of the plurality of activation DCI communications indicates another TCI state associated with a second SPS PDSCH communication of the plurality of SPS PDSCH communications.

13. The apparatus of claim 9, wherein the plurality of activation DCI communications indicate a plurality of resource allocations associated with the plurality of SPS PDSCH communications, wherein the plurality of resource allocations comprise at least one of a time domain resource allocation or a frequency domain resource allocation.

14. The apparatus of claim 13, wherein a first activation DCI communication of the plurality of activation DCI communications indicates a first resource allocation of the plurality of resource allocations, and
wherein a second activation DCI communication of the plurality of activation DCI indications indicates a second resource allocation of the plurality of resource allocations.

15. The apparatus of claim 5, wherein the at least one activation DCI communication comprises an activation DCI communication that carries the plurality of SPS PDSCH communication activation indications.

16. The apparatus of claim 15, wherein the activation DCI communication indicates a plurality of TCI states associated with the plurality of SPS PDSCH communication activation indications.

17. The apparatus of claim 15, wherein the activation DCI communication indicates a plurality of resource allocations associated with the plurality of SPS PDSCH communications, wherein the plurality of resource allocations comprise at least one of a time domain resource allocation or a frequency domain resource allocation.

18. The apparatus of claim 1, wherein the configuration indicates a plurality of resource allocations associated with the plurality of SPS PDSCH communications, wherein the plurality of resource allocations comprise at least one of a time domain resource allocation or a frequency domain resource allocation.

19. The apparatus of claim 1, wherein the one or more processors are further configured to:
receive the dynamic PDCCH communication that schedules a dynamic PDSCH communication; and
store the first TCI state in a memory.

20. The apparatus of claim 1, wherein the one or more processors are further configured to:
determine that the SPS PDSCH communication satisfies the reception condition;
determine that an additional SPS PDSCH communication satisfies the reception condition; and
select the SPS PDSCH communication to be received.

21. The apparatus of claim 20, wherein the one or more processors, to select the SPS PDSCH communication, are configured to select the SPS PDSCH communication based at least in part on determining that the SPS PDSCH communication is scheduled to be transmitted before the additional SPS PDSCH communication.

22. The apparatus of claim 1, wherein determining that the reception condition is satisfied is based at least in part on a TCI state associated with a control resource set (CORESET) that is associated with a search space set, wherein the search space set carries an activation downlink control information transmission that carries an SPS PDSCH communication activation indication corresponding to the SPS PDSCH communication.

23. The apparatus of claim 22, wherein the one or more processors are further configured to:
monitor the search space set for a physical downlink control channel in a first slot that occurs before a second slot, wherein the SPS PDSCH communication is associated with the second slot, and
wherein the one or more processors, to determine that the reception condition is satisfied, are configured to determine that the search space set is associated with the first slot.

24. The apparatus of claim 1, wherein the one or more processors are further configured to receive an additional configuration indicating an additional plurality of SPS PDSCH communications associated with an additional multicast service.

25. A method of wireless communication performed by a user equipment (UE), comprising:
receiving a configuration indicating a plurality of semi-persistent scheduling (SPS) physical downlink shared channel (PDSCH) communications associated with a multicast service; and
receiving, based at least in part on determining that a reception condition is satisfied, an SPS PDSCH communication of the plurality of SPS PDSCH communications, wherein the reception condition is determined to be satisfied based at least in part on determining that a first transmission configuration indicator (TCI) state associated with a dynamic physical downlink control channel (PDCCH) communication is different than a second TCI state associated with the SPS PDSCH communication and on determining that a source synchronization signal block (SSB) corresponding to the first TCI state corresponds to the second TCI state.

26. A non-transitory computer-readable medium storing a set of instructions for wireless communication comprising:
one or more instructions that, when executed by one or more processors of a user equipment (UE), cause the UE to:
receive a configuration indicating a plurality of semi-persistent scheduling (SPS) physical downlink shared channel (PDSCH) communications associated with a multicast service; and
receive, based at least in part on determining that a reception condition is satisfied, an SPS PDSCH communication of the plurality of SPS PDSCH communications, wherein the reception condition is determined to be satisfied based at least in part on determining that a first transmission configuration indicator (TCI) state associated with a dynamic physical downlink control channel (PDCCH) communication is different than a second TCI state associated with the SPS PDSCH communication and on determining that a source synchronization signal block (SSB) corresponding to the first TCI state corresponds to the second TCI state.

27. The non-transitory computer-readable medium of claim 26, wherein the one or more instructions, when executed by the one or more processors, cause the UE further to:
transmit acknowledgment or negative acknowledgement (ACK/NACK) feedback corresponding to the SPS PDSCH communication, wherein transmitting the ACK/NACK feedback comprises transmitting the ACK/NACK feedback on at least one of a physical uplink control channel resource associated with the SPS PDSCH communication or a physical uplink shared channel.

28. The non-transitory computer-readable medium of claim 26, wherein the one or more instructions, when executed by the one or more processors, cause the UE further to:
receive a plurality of SPS PDSCH communication activation indications corresponding to the plurality of SPS PDSCH communications.

29. The non-transitory computer-readable medium of claim 28, wherein the plurality of SPS PDSCH communication activation indications indicate a plurality of beams associated with the plurality of SPS PDSCH communications, and
wherein the SPS PDSCH communication is associated with a beam of the plurality of beams.

30. An apparatus for wireless communication comprising:
means for receiving a configuration indicating a plurality of semi-persistent scheduling (SPS) physical downlink shared channel (PDSCH) communications associated with a multicast service; and
means for receiving, based at least in part on determining that a reception condition is satisfied, an SPS PDSCH communication of the plurality of SPS PDSCH communications, wherein the reception condition is determined to be satisfied based at least in part on determining that a first transmission configuration indicator (TCI) state associated with a dynamic physical downlink control channel (PDCCH) communication is different than a second TCI state associated with the SPS PDSCH communication and on determining that a source synchronization signal block (SSB) corresponding to the first TCI state corresponds to the second TCI state.

* * * * *